US009083670B1

(12) United States Patent
Boncha et al.

(10) Patent No.: US 9,083,670 B1
(45) Date of Patent: Jul. 14, 2015

(54) NOTIFICATIONS ABOUT USERS IN A SOCIAL NETWORK

(75) Inventors: Alison Boncha, San Francisco, CA (US); Brett Rolston Lider, San Francisco, CA (US); Zachary Yeskel, San Francisco, CA (US); Bin Chang, San Bruno, CA (US); Joseph Robert Smarr, Half Moon Bay, CA (US); Balaji Srinivasan, Fremont, CA (US)

(73) Assignee: Google Inc., Mountain View, CA (US)

( * ) Notice: Subject to any disclaimer, the term of this patent is extended or adjusted under 35 U.S.C. 154(b) by 252 days.

(21) Appl. No.: 13/586,802

(22) Filed: Aug. 15, 2012

Related U.S. Application Data (60) Provisional application No. 61/567,102, filed on Dec. 5, 2011.

(51) Int. Cl.
*H04L 12/58* (2006.01)
*H04L 29/08* (2006.01)
*G06Q 50/00* (2012.01)
*G06Q 30/02* (2012.01)
*G06F 17/30* (2006.01)

(52) U.S. Cl.
CPC ............ *H04L 51/32* (2013.01); *G06F 17/3053* (2013.01); *G06F 17/30595* (2013.01); *G06Q 30/0201* (2013.01); *G06Q 30/0224* (2013.01); *G06Q 30/0252* (2013.01); *G06Q 30/0269* (2013.01); *G06Q 50/01* (2013.01); *H04L 67/22* (2013.01)

(58) Field of Classification Search
None
See application file for complete search history.

(56) References Cited

U.S. PATENT DOCUMENTS

| | | | |
|---|---|---|---|
| 8,700,540 B1* | 4/2014 | Zambrano et al. ............. 705/319 |
| 2009/0307205 A1* | 12/2009 | Churchill et al. ................. 707/5 |
| 2012/0110052 A1* | 5/2012 | Smarr et al. ................... 709/201 |
| 2013/0044959 A1* | 2/2013 | Mitchell et al. ............... 382/217 |
| 2013/0046770 A1* | 2/2013 | Tseng .......................... 707/748 |
| 2013/0227011 A1* | 8/2013 | Sharma et al. ................ 709/204 |
| 2013/0268591 A1* | 10/2013 | Chen et al. .................... 709/204 |
| 2014/0089320 A1* | 3/2014 | Baldwin et al. ............... 707/748 |
| 2014/0089418 A1* | 3/2014 | Davenport et al. ........... 709/206 |
| 2014/0108153 A1* | 4/2014 | Matus ........................ 705/14.66 |
| 2014/0123228 A1* | 5/2014 | Brill et al. .......................... 726/4 |

* cited by examiner

*Primary Examiner* — Mohamed Ibrahim
*Assistant Examiner* — James Fiorillo
(74) *Attorney, Agent, or Firm* — McDermott Will & Emery LLP (57) ABSTRACT

Various aspects of the subject technology relate to systems, methods, and machine-readable media for providing a user with notifications about events in a social network. A system may be configured to determine that a number of events for a user have occurred on a social network, wherein each event for the user is associated with an entity, calculate a score for each event based on a profile for the user and a profile for the entity associated with the event, and generate a notification for the user, wherein the notification comprises a plurality of information elements, wherein each information element is associated with one of the events in the number of events, and wherein the plurality of information elements in the notification are prioritized based on the score for each of the events.

20 Claims, 11 Drawing Sheets

NOTIFICATIONS ABOUT USERS IN A SOCIAL NETWORK

RELATED APPLICATION

This application claims priority to U.S. provisional patent application 61/567,102, filed on Dec. 5, 2011, entitled "NOTIFICATIONS ABOUT USERS IN A SOCIAL NETWORK," the entire contents of which are herein incorporated by reference in its entirety.

BACKGROUND

The present disclosure generally relates to notifications and, in particular, notifications about users in a social network.

Some social networking services may allow users to form social circles (e.g., a group of users) and share information with one or more social circles in the social network. These social circles may include a user's personal contacts, professional contacts, or a combination of these. The social circles may also be formed around users that share a common interest or a common characteristic.

In some cases, social networking services allow users to define multiple social circles and assign different contacts to one or more of the social circles. For example, a user may define a social circle for family members, a social circle for friends, a social circle for coworkers, or social circles for any other group of contacts.

SUMMARY

Various aspects of the subject technology relate to a system for providing a user with notifications about events in a social network. The system may include one or more processors and a machine-readable medium comprising instructions stored therein, which when executed by the one or more processors, cause the one or more processors to perform operations. The operations may include determining that a number of events for a first user have occurred on a social network, wherein each event for the first user is associated with a second user, calculating a score for each event based on a profile for the first user and a profile for the second user associated with the event, and generating a notification for the first user, wherein the notification comprises a plurality of information elements, wherein each information element is associated with one of the events in the number of events, and wherein the plurality of information elements in the notification are prioritized based on the score for each of the events.

Other aspects of the subject technology relate to a method for providing a user with notifications about social graph events in a social network. The method may include determining that a number of social graph events for a user have occurred on a social network, wherein each social graph event for the user is associated with an entity, calculating a score for each social graph event based on a profile for the user and a profile for the entity associated with the social graph event, and generating a notification for the user, wherein the notification comprises a plurality of information elements, wherein each information element is associated with one of the social graph events in the number of social graph events, and wherein the plurality of information elements in the notification are prioritized based on the score for each of the social graph events.

Various aspects of the subject technology relate to a non-transitory machine-readable medium comprising instructions stored therein, which when executed by a machine, cause the machine to perform operations for providing a user with notifications about interactions with related users in a social network. The operations may include determining that a number of social graph events for a user have occurred on a social network, wherein each social graph event for the user is associated with an entity, calculating a score for each social graph event based on information for the user and information for the entity associated with the social graph event, and generating a notification for the user, wherein the notification comprises a plurality of information elements, wherein each information element is associated with one of the social graph events in the number of social graph events, and wherein the plurality of information elements in the notification are prioritized based on the score for each of the social graph events.

These and other aspects can include the following features. In some aspects, the determining of the number of social graph events for the user includes determining that an entity has added the user to a social circle of the entity. The entity may be in a social circle for the user. In some aspects, the determining of the number of social graph events for the user includes determining that an entity that the user has invited to join the social network has joined the social network.

Some aspects may also include transmitting the notification to the user and/or delaying the transmitting of the notification to the user for a period of time based on the score for each of the social graph events. In some aspects, the profile for the user comprises background information for the user and contacts for the user and the calculating of the score for each social graph event based on the profile for the user and the profile for the entity associated with the social graph event is based on contacts that the user has in common with the entity.

By providing the notifications about interactions with related users in a social network, a user may be informed of, for example, when new people join the social network or when new connections are made.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding of the subject technology and are incorporated in and constitute a part of this specification, illustrate disclosed aspects of the subject technology and together with the description serve to explain the principles of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent that the subject technology may be practiced without these specific details.

Various aspects of the subject technology relate to systems and methods for providing a user with notifications about interactions with related users in a social network. For example, a user of a social networking service may receive notifications when one or more entities (e.g., other users or individuals that the user may or may not know) add the user to a social circle. In another aspect, the user may also receive notifications when entities that the user has added to a social circle also adds the user to a social circle (e.g., a entity in one of the user's social circles has added the user back). According to still another aspect, the user may receive a notification when entities that the user has invited to join the social networking service join the social networking service.

By providing the notifications about interactions with related users in a social network, a user may be informed of, for example, when new people join the social network or when new connections are made. According to one aspect, for example, a user may be informed about things such as 1) possible entities that the user may add to one or more of the user's social circles, 2) which entities may see information or updates about the user, and 3) which entities the user will be able to receive information or updates about.

Figure 1:
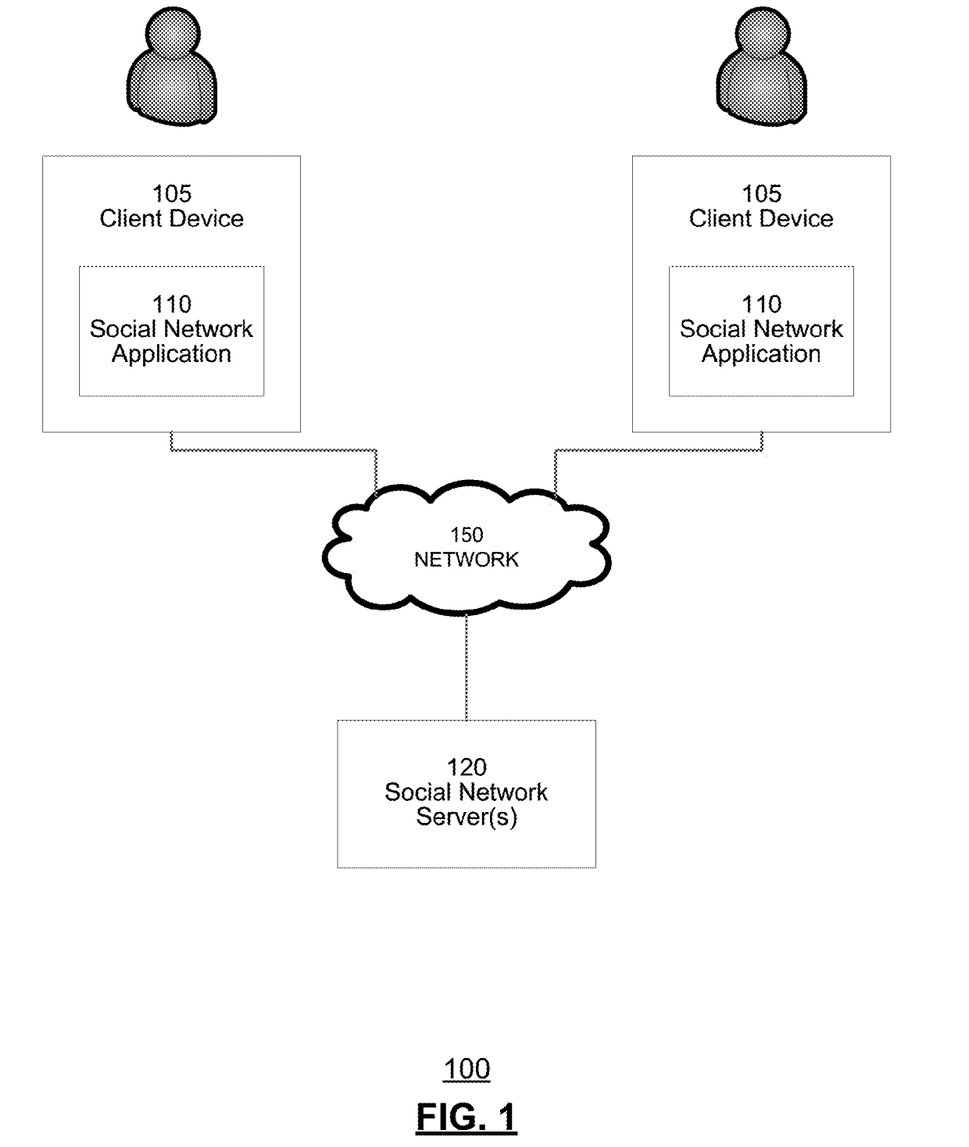
FIG. 1 is a block diagram illustrating an example environment in which a user may be provided with notifications about users in a social networking service, in accordance with various aspects of the subject technology.

FIG. 1 is a block diagram illustrating an example environment 100 in which a user may be provided with notifications about users in the social networking service, in accordance with various aspects of the subject technology. Although FIG. 1 illustrates a client-server network environment 100, other aspects of the subject technology may include other configurations including, for example, peer-to-peer environments. The network environment includes one or more client devices 105 and one or more social network servers 120 connected via a network 150 (e.g., the Internet).

The network 150 may include, for example, any one or more of a cellular network, a satellite network, a personal area network (PAN), a local area network (LAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Each client device 105 may be any machine able to communicate with the social network servers 120 via the network 150, receive a notification from the network servers 120, and notify a user. For example, client device 105 may be a desktop computer, a laptop, a mobile device (e.g., a smart phone, tablet, personal digital assistant (PDA), etc.), or any other machine with a processor, memory, and communications capabilities.

Each client device 105 may also include a social network application 110, such as a web browser or a dedicated program (e.g., an "app" for a mobile device). The social network applications 110 may be configured to enable a user to interact with a social networking service hosted by the social network servers 120 and access the functionalities provided by the social networking service. The social networking applications 110 may also be configured to receive notifications from the social networking service. The notifications may be in the form of a visual notification (e.g., a user interface element displayed on a screen of the client device 105), an audible notification (e.g., a ring or beep), or a haptic notification (e.g., a vibration).

Figure 2:
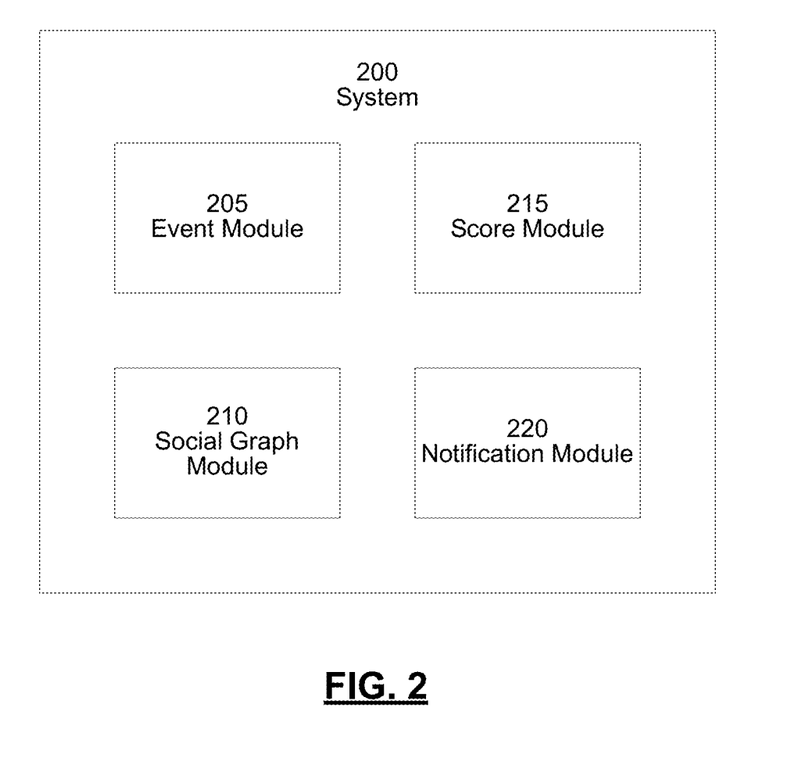
FIG. 2 is a block diagram illustrating an example system configured to provide a user with notifications for events associated with other users, in accordance with various aspects of the subject technology.

The one or more social network servers 120 may be systems or devices having a processor, a memory, and communications capability that may be used host a social network service and transmit notifications to client devices 105. For example, FIG. 2 is a block diagram illustrating an example system 200 configured to provide a user with notifications for events associated with other users (e.g., entities), in accordance with various aspects of the subject technology. The system 200 may include an event module 205, a social graph module 210, a score module 215, and a notification module 220.

The social graph module 210 may be configured to process the connections and social circles within the social network. For example, for each user, the social graph module 210 may store a user profile that contains information about the user (e.g., name, location, interests, groups the user belongs to, etc.), a list of contacts for the user, social circles for the user and all members of the social circles, other users the user has invited to join the social network, user actions within the social network, or any other information associated with the user of the social networking service. The term "social circle" as used herein encompasses its plain and ordinary meaning, including, but not limited to a set or group of members or contacts.

The event module 205 may be configured to determine whether various events have occurred on the social network. For example, the event module 205 may determine that a user has invited another user to the social network, that a user has joined the social network, that a user has added another user to one or more social circles, or when the other user has reciprocated and added the user back.

When the event module 205 determines that certain events have occurred, the notification module 205 may be configured generate a notification to one or more users and transmit the notifications to the users. For example, when the event module 205 determines that an entity (e.g., another user or group) has added a user to a social circle, the notification module 220 may generate a notification to the user informing the user of the addition and transmit the notification to the user. In addition to informing the user that the other entities have added the user to a social circle, the notification may further serve to suggest that the user add the other entities to one or more of the user's circles.

In some cases, the event module 205 may determine that a number of entities have added a user to a social circle. According to various aspects of the subject technology, the notification module 220 may be configured to group notifications together and send a single combined notification that informs the user of the multiple entities that have added the user to a social circle. One example of a notification is discussed below with respect to FIG. 3 and FIG. 4.

Figure 3:
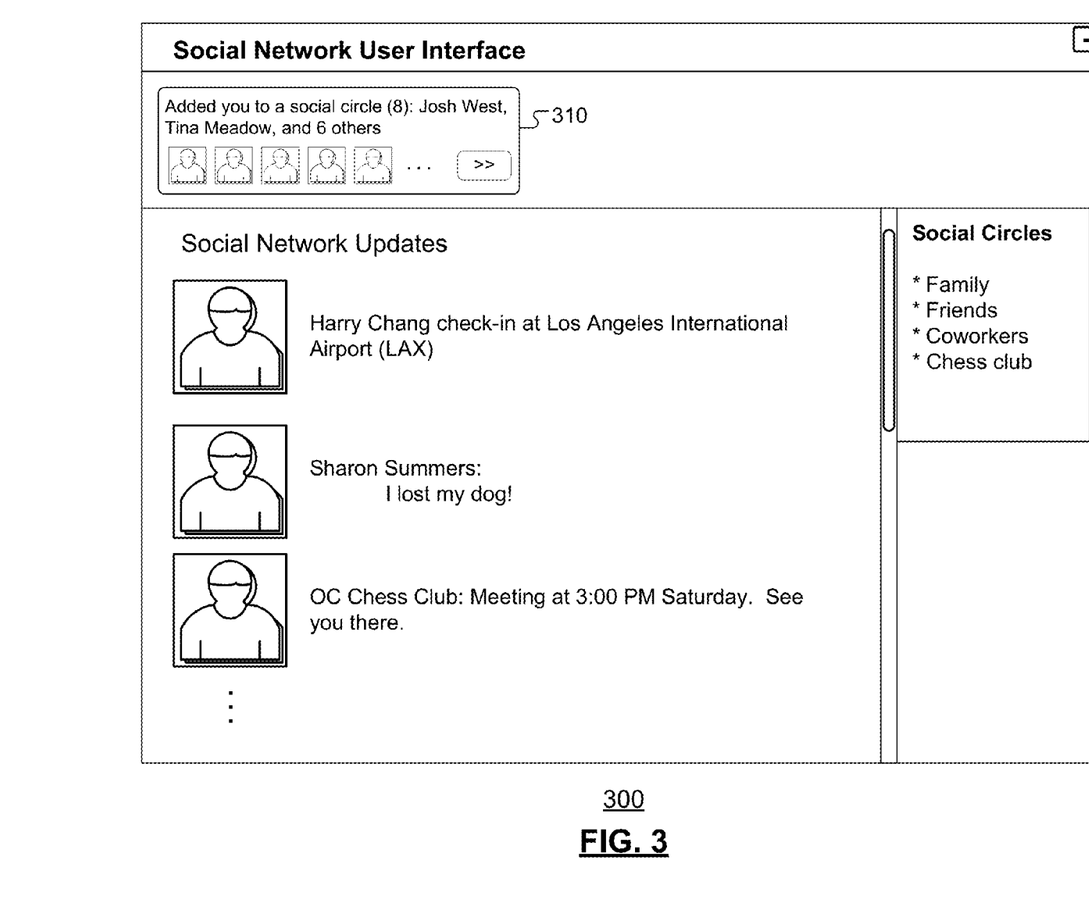
FIG. 3 is an illustration of an example user interface that includes a notification, according to one aspect of the subject technology.

FIG. 3 is an illustration of an example user interface 300 that includes a notification 310, according to one aspect of the subject technology. The user interface 300 may be displayed to a user on a client device and include a number of areas displaying information about the social circles associated with the user.

The notification 310 may be designed to notify the user that one or more entities (e.g., other users of the social network) have added the user a social circle. The notification 310 may include information about the number of entities that have added the user to a social circle and other information about the entities such as the names of the entities and pictures associated with the entities.

According to one aspect, a user may obtain more information about the entities that have added the user to a social circle by selecting the notification 310. In response to the selection of the notification 310, the user interface may display a notification window showing further details about the adding entities.

Figure 4:
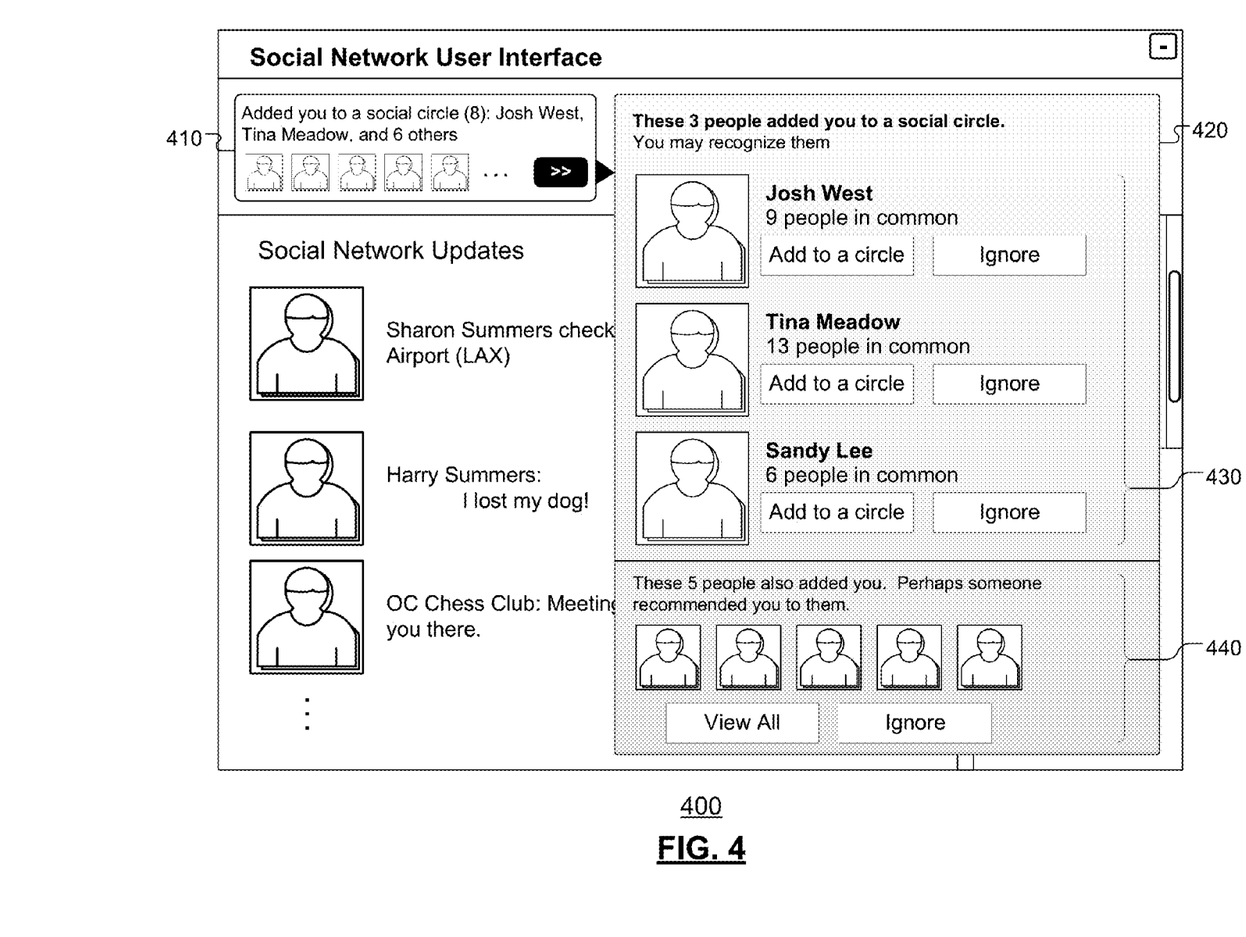
FIG. 4 is an illustration of an example user interface that includes a notification window, according to one aspect of the subject technology.

For example, FIG. 4 is an illustration of an example user interface 400 that includes a notification window 420, according to one aspect of the subject technology. The notification window 420 may be displayed in response to a user selecting the notification 410. The notification window 420 may include an information element for each entity that has added the user to a circle. Each information element may include a picture associated with the entity (that may be useful for the user in identifying the entity), the name of the entity, a number of common contacts, and one or more actions to perform. The actions may include, for example, adding an entity to a user's social circle, ignoring the entity, or viewing the profile of the entity.

The entities shown in the notification 310 of FIG. 3 or the notification window 420 if FIG. 4 may be prioritized based on the likelihood that the user knows the entities or based on a score that represents how close in relationship the user and the entities are. For example, referring back to FIG. 2, a score module 215 of the system 200 may be configured to calculate a score representing the likelihood that the user knows the entity for each entity in the notification window 420.

The score may be calculated based on information contained in the profile for the user and a profile for the entity stored in the social graph module 210. Each profile may include information such as a list of contacts for the user and the entity, the circles that the user or the entity belong to, the members of those circles that the user of the entity belong to, or any other piece of information associated with the user or the entity.

According to one aspect, the entities may be ordered according to their calculated scores and displayed in the notification window 420. In one aspect, certain entities that have a score above a threshold level or entities that have one of the highest scores (e.g., the 3 entities with the top scores) may be displayed in a prioritized area 430 in the notification window 420. The remaining entities may be displayed in a separate area 440 in the notification window 420.

In another aspect, the event module 205 may determine when one or more entities that a user already has in a social circle adds the user back (e.g., an entity places the user in one of the entity's social circles). In response to determining that one or more entities have added the user back, the notification module 220 may be configured to generate a notification that informs the user of the one or more entities that have added the user to a social circle. One example of a notification is discussed below with respect to FIG. 5 and FIG. 6.

Figure 5:
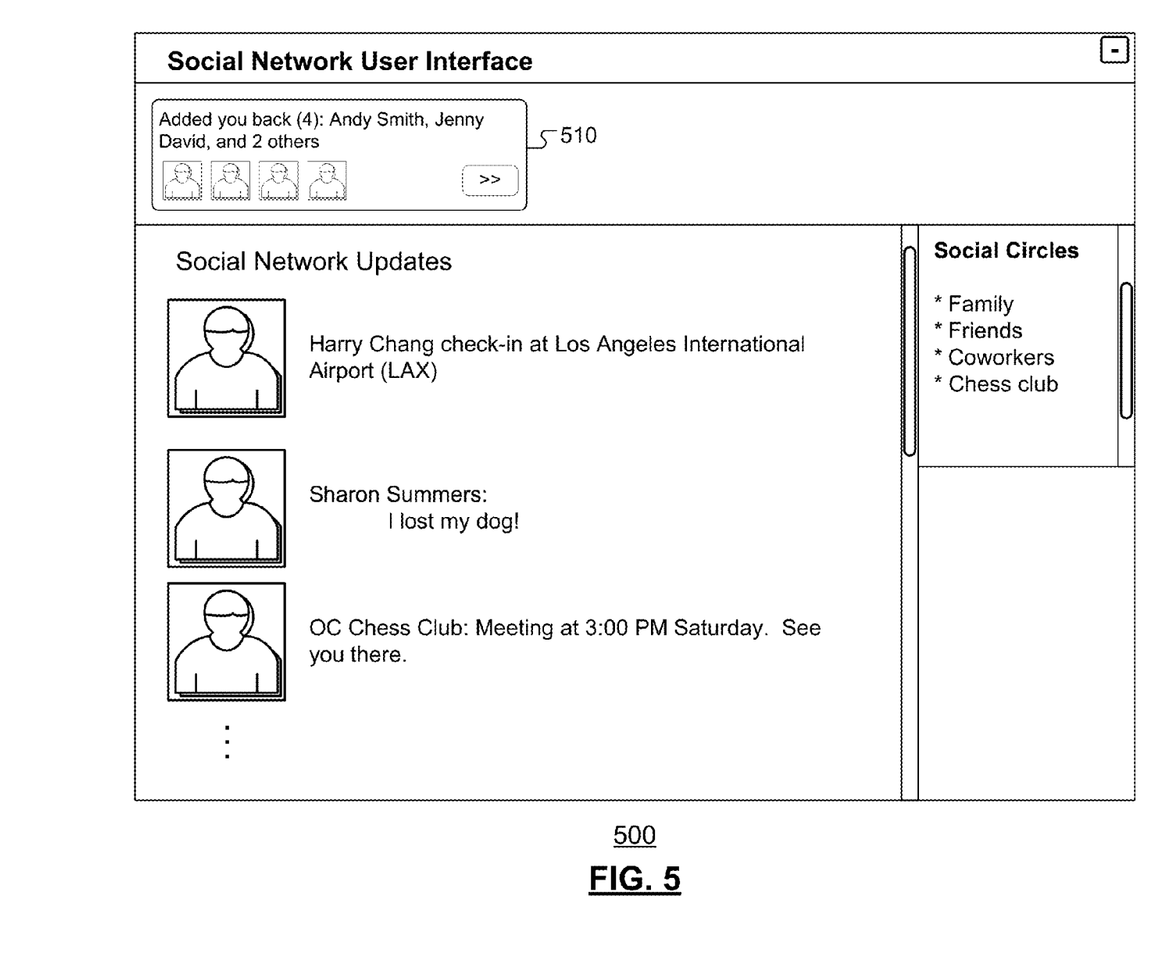
FIG. 5 is an illustration of an example user interface that includes a notification, according to one aspect of the subject technology.

FIG. 5 is an illustration of an example user interface 500 that includes a notification 510, according to one aspect of the subject technology. The notification 510 may be designed to notify the user that one or more entities that the user has in one of the user's social circles have also added the user a social circle. The notification 510 may include information about the number of entities that have added the user back and other information about the entities such as the names of the entities and pictures associated with the entities.

The user may obtain more information about the entities that have added the user back by selecting the notification 510. In response to the selection of the notification 510, the user interface may display a notification window showing further details about the adding entities.

Figure 6:
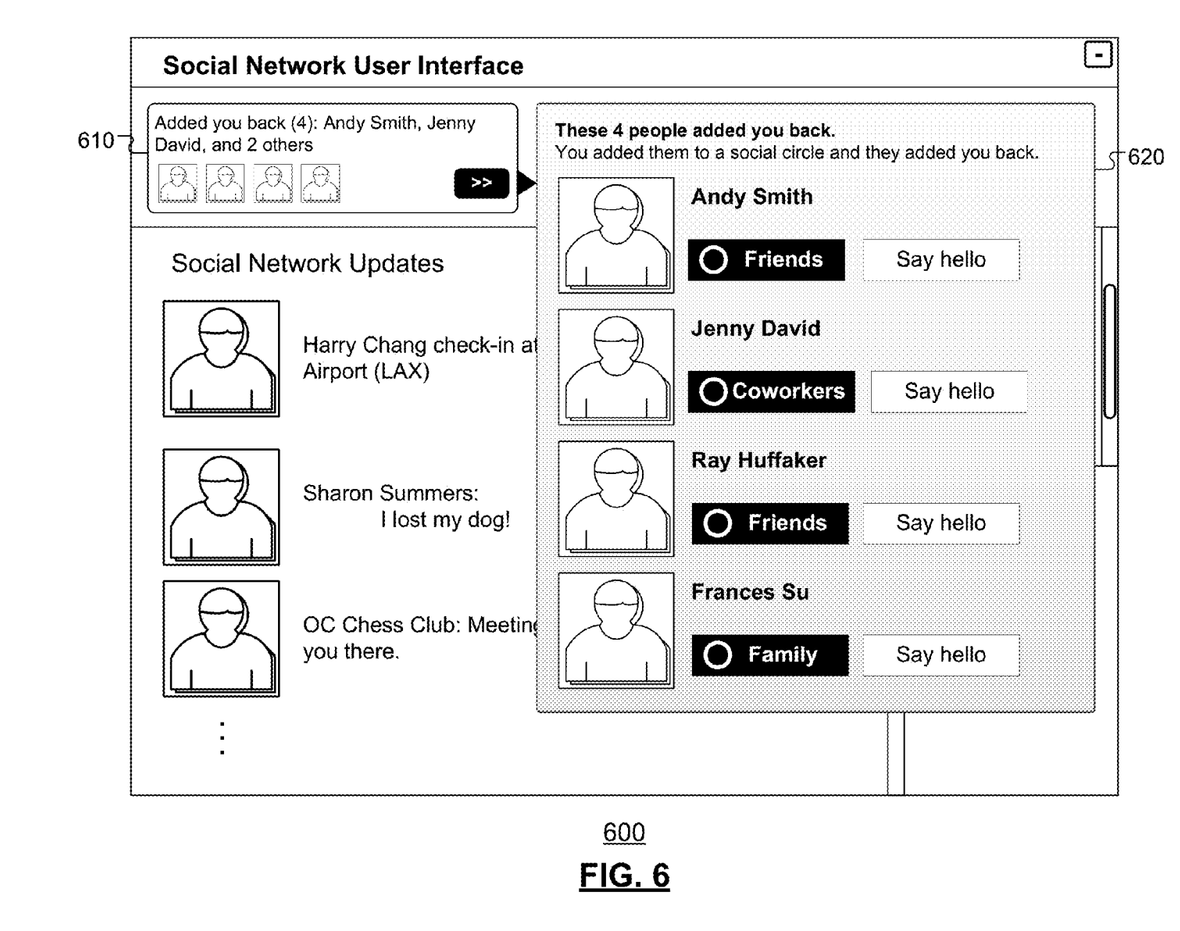
FIG. 6 is an illustration of an example user interface that includes a notification window, according to one aspect of the subject technology.

For example, FIG. 6 is an illustration of an example user interface 600 that includes a notification window 620, according to one aspect of the subject technology. The notification window 620 may include an information element for each entity that has added the user to a circle. Each information element may include picture associated with the entity, the name of the entity, the name of the entity, the user's social circle that the entity is in (e.g., a friends circle, a coworkers circle, a family circle, etc.), and one or more actions to perform. The actions may include, for example, viewing the social circle that the entity is in, viewing the profile of the entity, or sending a message to the entity.

Furthermore, the entities shown in the notification 510 of FIG. 5 or the notification window 620 if FIG. 6 may be prioritized based on the likelihood that the user knows the entities or based on a score that represents how close in relationship the user and the entities are. The score may be calculated based on, for example, information contained in the profiles of the user and the entity (e.g., education, hometown, location, etc.), common contacts for the user and the entity, the circles or other groups that the user and the entity belong to, or any data accessible to the system that may be used to determine a measure of closeness in relationship between the user and the entity.

In another aspect, the event module 205 may determine when one or more entities that a user has invited to join the social network joins the social network. In response to determining that one or more entities the user has invited has joined the social network, the notification module 220 may be configured to generate a notification to inform the user. One example of a notification is discussed below with respect to FIG. 7 and FIG. 8.

Figure 7:
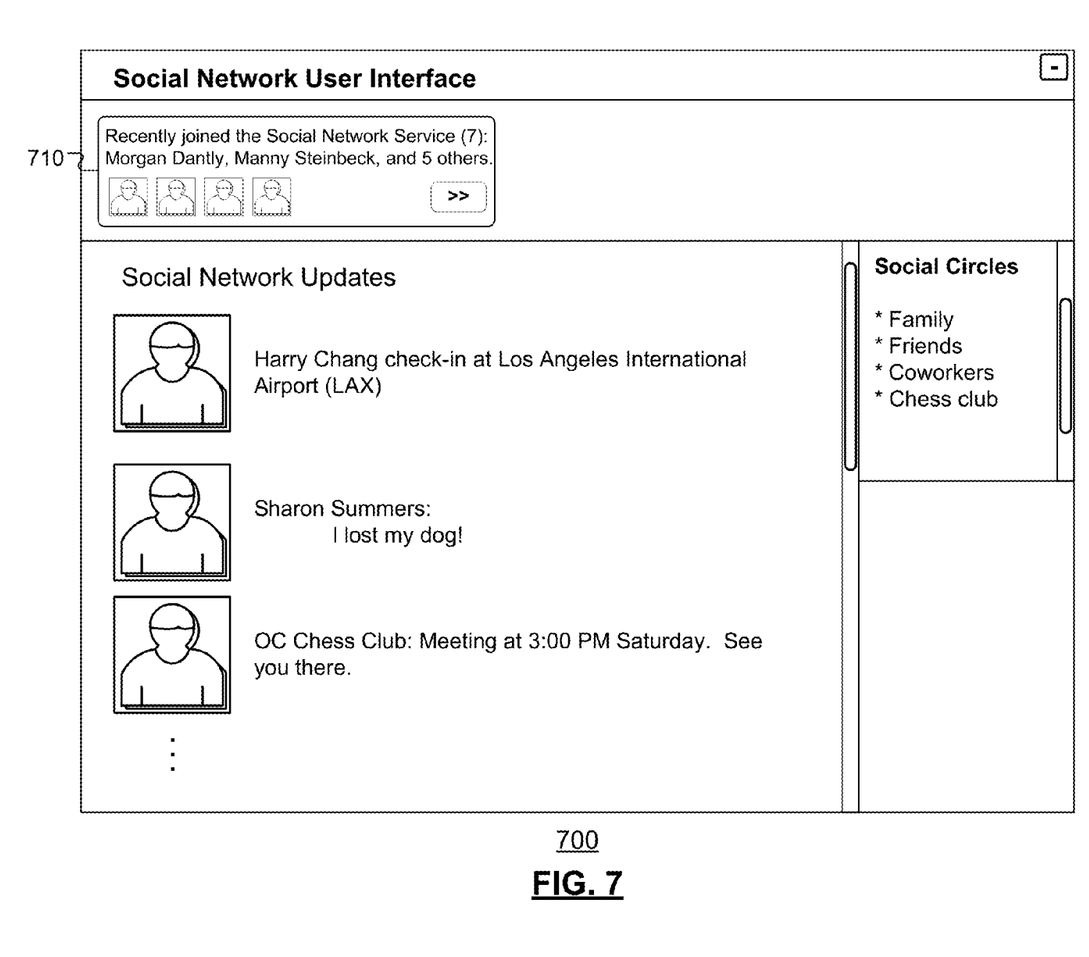
FIG. 7 is an illustration of an example user interface that includes a notification, according to one aspect of the subject technology.

FIG. 7 is an illustration of an example user interface 700 that includes a notification 710, according to one aspect of the subject technology. The notification 710 may be designed to notify the user that one or more entities that the user has invited to join the social network has joined the social network. The notification 710 may include information about the number of entities that have joined the social network and other information about the entities such as the names of the entities and pictures associated with the entities.

The user may obtain more information about the entities that have joined the social network by selecting the notification 710. In response to the selection of the notification 710, the user interface may display a notification window showing further details about the adding entities.

Figure 8:
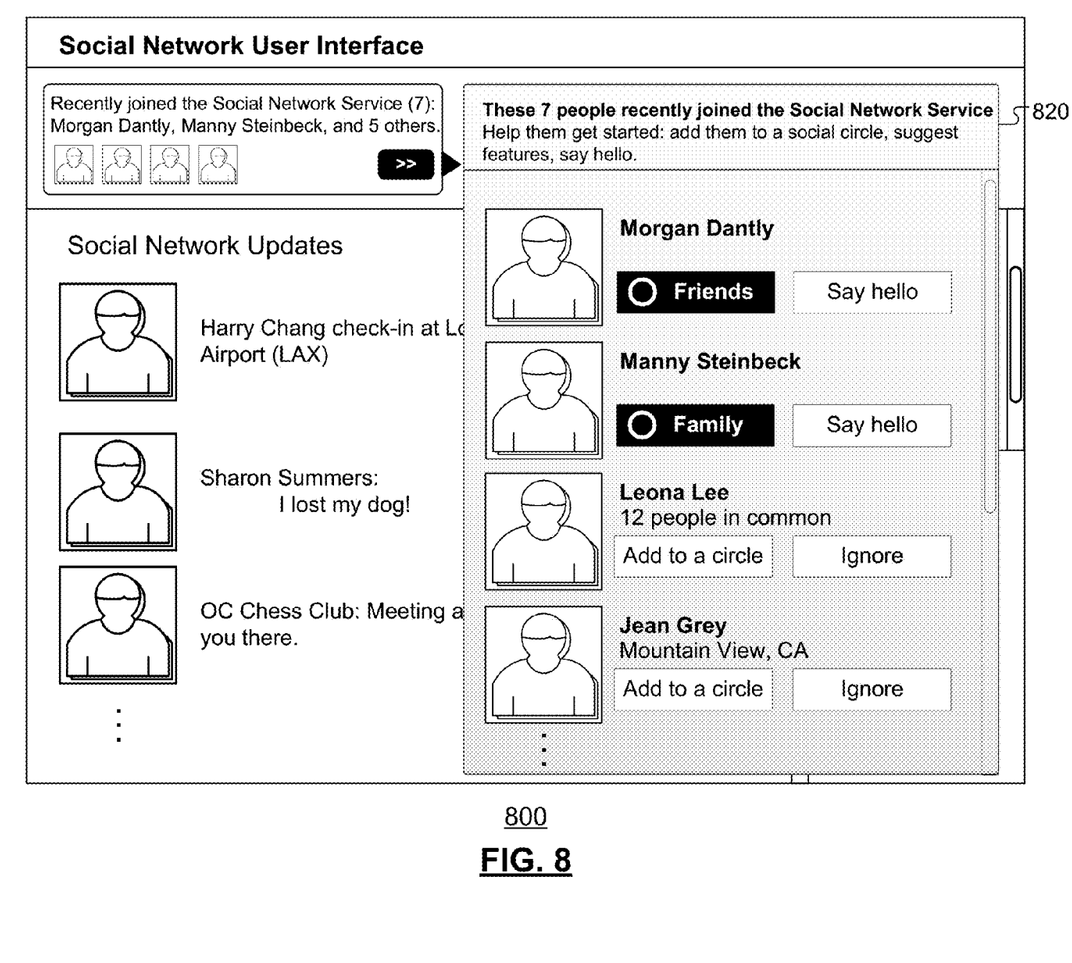
FIG. 8 is an illustration of an example user interface that includes a notification window, according to one aspect of the subject technology.

For example, FIG. 8 is an illustration of an example user interface 800 that includes a notification window 820, according to one aspect of the subject technology. The notification window 820 may include an information element for each entity that the user has invited to join the social network and has joined the social network. Each information element may include large picture associated with the entity and the name of the entity.

Each information element may include further information based on whether or not the user has assigned the entity to a social circle of the user. For example, if the user has assigned the entity to a social circle, the information element may include the social circle that the entity is in (e.g., a friends circle, a family circle, etc.) and one or more actions to perform. The actions may include, for example, viewing the social circle that the entity is in, viewing the profile of the entity, or sending a message to the entity.

If the user has not assigned the entity to a social circle, the information element may include a number of common contacts and one or more actions to perform. The actions may include, for example, adding the entity to one of the user's social circle, ignoring the entity, or viewing the profile of the entity. Furthermore, as discussed above, the information elements may be prioritized based on the a calculated measure of closeness between the user and the entity.

Although certain types of notifications are discussed above, according to some aspects, other types of notifications are also possible. For example, notifications can also be provided to notify a user of particular interactions, e.g., responses to the user's posts or shared items, posts by others in certain social circles associated with the user, other users joining, leaving, or creating groups, or any other activities that may occur on the social network. These notifications may inform a user when certain actions are performed on the social network (e.g., one user publishes a post on the social network or shares information) or any other activity that occurs on the social network.

According to another aspect, a notification informing a user that an entity has added the user to a circle may be delivered immediately or delayed (e.g., held back) based on the score associated with the entity. For example, if the score exceeds a threshold (e.g., is considered high and above a threshold score), a notification informing the user that the entity has added the user to a circle may be delivered immediately. If the score does not exceed the threshold (e.g., is considered low and is at or below the threshold score), the notification may be delayed. When notifications are delayed, in some cases, they may be grouped together and transmitted to a user in a combined notification that informs the user that several entities have added the user to social circles (e.g., see notification window 420 of FIG. 4).

Figure 9:
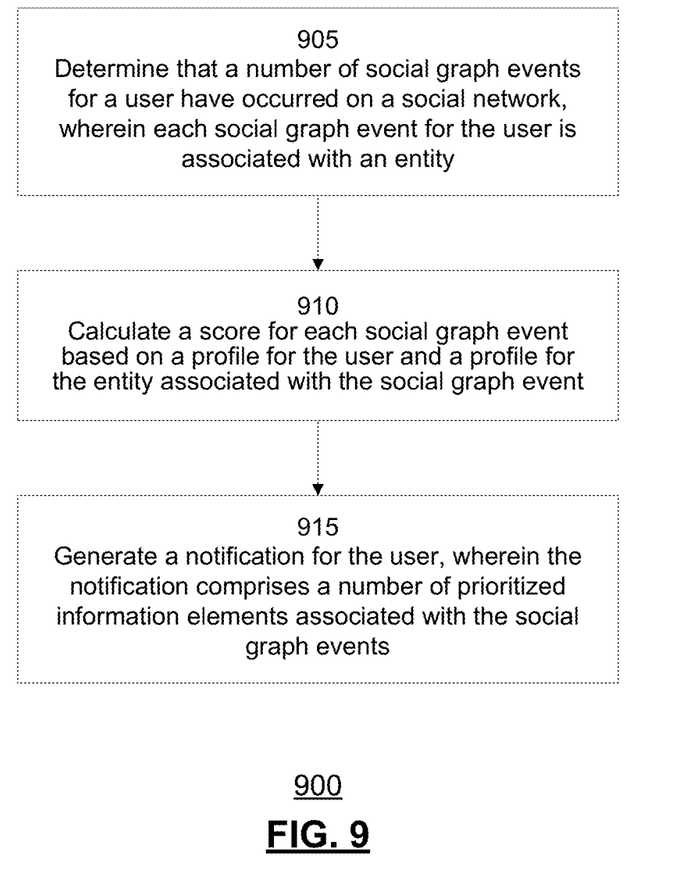
FIG. 9 is a flow chart illustrating an example process for providing a user with a notification for social graph events, in accordance with various aspects of the subject technology.

FIG. 9 is a flow chart illustrating an example process 900 for providing a user with a notification for social graph events, in accordance with various aspects of the subject technology. Although the steps in process 900 are shown in a particular order, certain steps may be performed in different orders or at the same time. In addition, although the process steps of FIG. 9 are described with reference to the components of the system 200 in FIG. 2, the steps are not limited to being performed these components.

At step 905, when the event module 205 may determine that a number of social graph events for a user have occurred on a social network. Each of the social graph events for the user may also be associated with another entity (e.g., another user). In some cases, the social graph events may include new connections that have been created in the social graph that may occur when, for example, an entity adds the user to one of the entity's social circles, when an entity that is already in one of the user's social circles also adds the user to one of the entity's social circles (e.g., the entity adds the user back), or when an entity that the user invites to the social network, joins the social network.

In response to determining that the social graph events have occurred, the score module 215 may calculate a score for each social graph event at step 910. The score for each social graph event may be determined based on a profile for the user and a profile for the entity associated with the social graph event (e.g., the entity that added the user to a social circle). Each profile may be stored by the social graph module 210 in a data repository and contain various information about a user of the social network. A profile may include, for example, a user name, a profile picture or other pictures, background information (e.g., location information, education information, etc.), contacts associated with the user, social circles associated for the user, contacts in the social circles for the user, or any other information about the user that is accessible to the social networking service.

In one aspect, the score module 215 may calculate the score for a social graph event based on whether or not the entity associated with the social graph event is in the user's list of contacts (e.g., the entity is in one of the user's social circles). If the entity is in the user's list of contacts, the social graph event associated with the entity may receive a higher score than a social graph event associated with another entity that is not in the user's list of contacts.

In another aspect, the score module 215 may calculate a score for a social graph event based on the number of shared contacts between the user and the entity associated with the social graph event. For example, a social graph event associated with an entity that shares a large number of contacts with the user may receive a higher score than a social graph event associated with another entity with fewer contacts in common with the user.

At step 915, the notification module 220 may generate a notification for the user that includes a number of information elements where each information element notifies the user about a social graph event and may contain information about the social graph event. According to one aspect, the information elements may be prioritized for display based on the calculated scores for their corresponding social graph event. The notification may be transmitted to a client device so that the notification may be provided to the user. For example, the notification may be displayed to the user as a notification window in a user interface (e.g., notification window 420 in FIG. 4).

In one aspect, a notification informing a user that an entity has added the user to a circle may be delivered immediately or delayed based on the score associated with the entity. For example, if the score exceeds a threshold, a notification informing the user that the entity has added the user to a circle may be delivered within a short time frame. If the score does not exceed the threshold, the notification may be delivered within a longer time frame. In some aspects, notifications may be grouped together and delivered to a user in a combined notification that informs the user that several entities have added the user to social circles.

According to one aspect of the subject technology, a separate notification may be generated for different types of social graph events. For example, one notification may be generated for entities adding the user to a social circle when the entities do not belong to a social circle of the user, another notification may be generated for entities adding the user to a social circle when the entities belong to a social circle of the user, and another notification may be generated for entities, which were invited by the user to join the social network, joining the social network.

In other aspects, notifications may be generated for more than one type of social graph events. In some cases, the scores calculated for the social graph events may also be based on the type of social graph event. For example, social graph events of a particular type may be prioritized over social graph events of another type.

Figure 10:
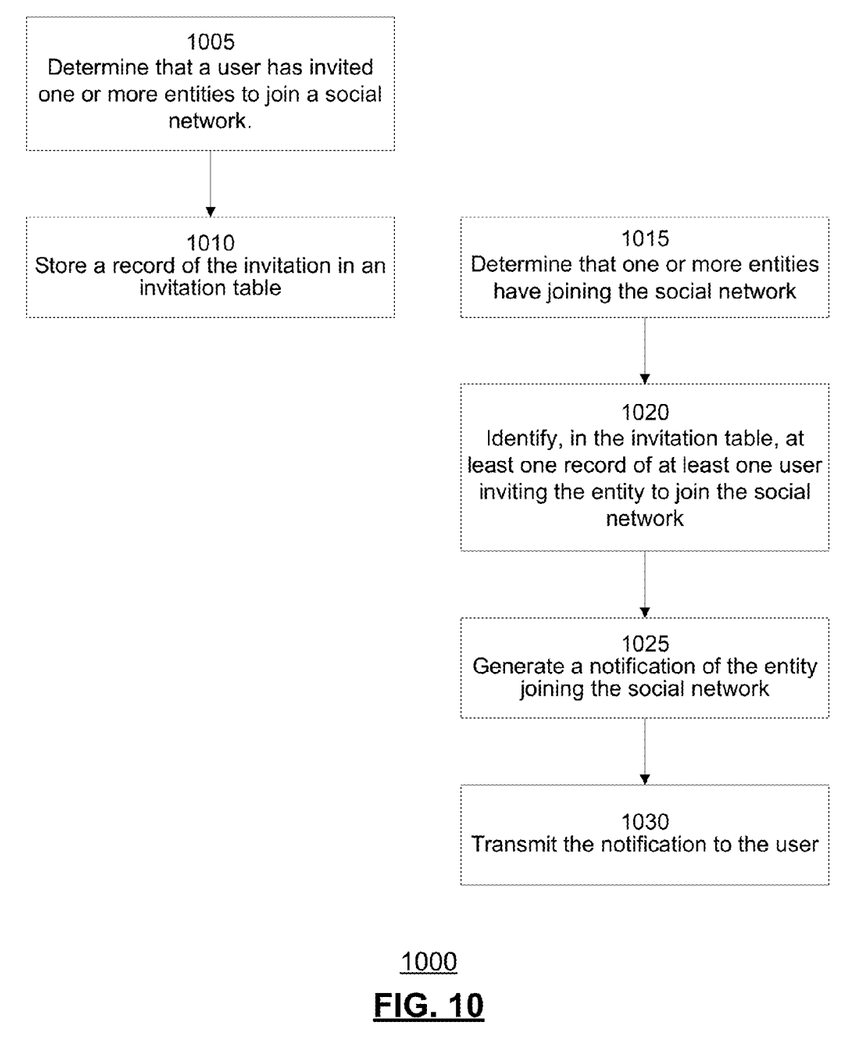
FIG. 10 is a flow chart illustrating an example process for generating a notification based on one or more entities joining a social network, in accordance with various aspects of the subject technology.

According to some aspects of the subject technology, additional steps may be needed to generate notifications for social graph events where an entity, invited by a user, joins a social network. For example, FIG. 10 is a flow chart illustrating an example process 1000 for generating a notification based on one or more entities joining a social network, in accordance with various aspects of the subject technology. Although the steps in process 1000 are shown in a particular order, certain steps may be performed in different orders or at the same time. In addition, although the process steps of FIG. 10 are described with reference to the components of the system 200 in FIG. 2, the steps are not limited to being performed by these components.

At step 1005, when the event module 205 may determine that a user has invited one or more entities to join a social network. At step 1010, the social graph module 210 may store a record of each invitation that the user sent in an invitation table.

Some time later (e.g., at step 1015) the event module 205 may determine that one or more entities have joined the social network by, for example, accepting the user's invitation to join the social network, accepting another user's invitation to join the social network, or joining the social network without accepting an invitation. In response to determining that an entity has joined the social network, the social graph module 210 may look up the invitation table and identify all user's that have invited the entity to join the social network at step 1020.

At step 1025, the notification module 220 may generate a notification for a user that informs the user that one or more entities that the user has invited has joined the social network and transmit the notification to the user at step 1030 (see notification 710 in FIG. 7 and notification window 820 in FIG. 8). According to some aspects, the notification may include a number of information elements, where each information element includes information about an entity that the user has invited to the social network and that has joined the social network. As discussed above, these information elements may also be prioritized based on a calculated score for each information element.

Figure 11:
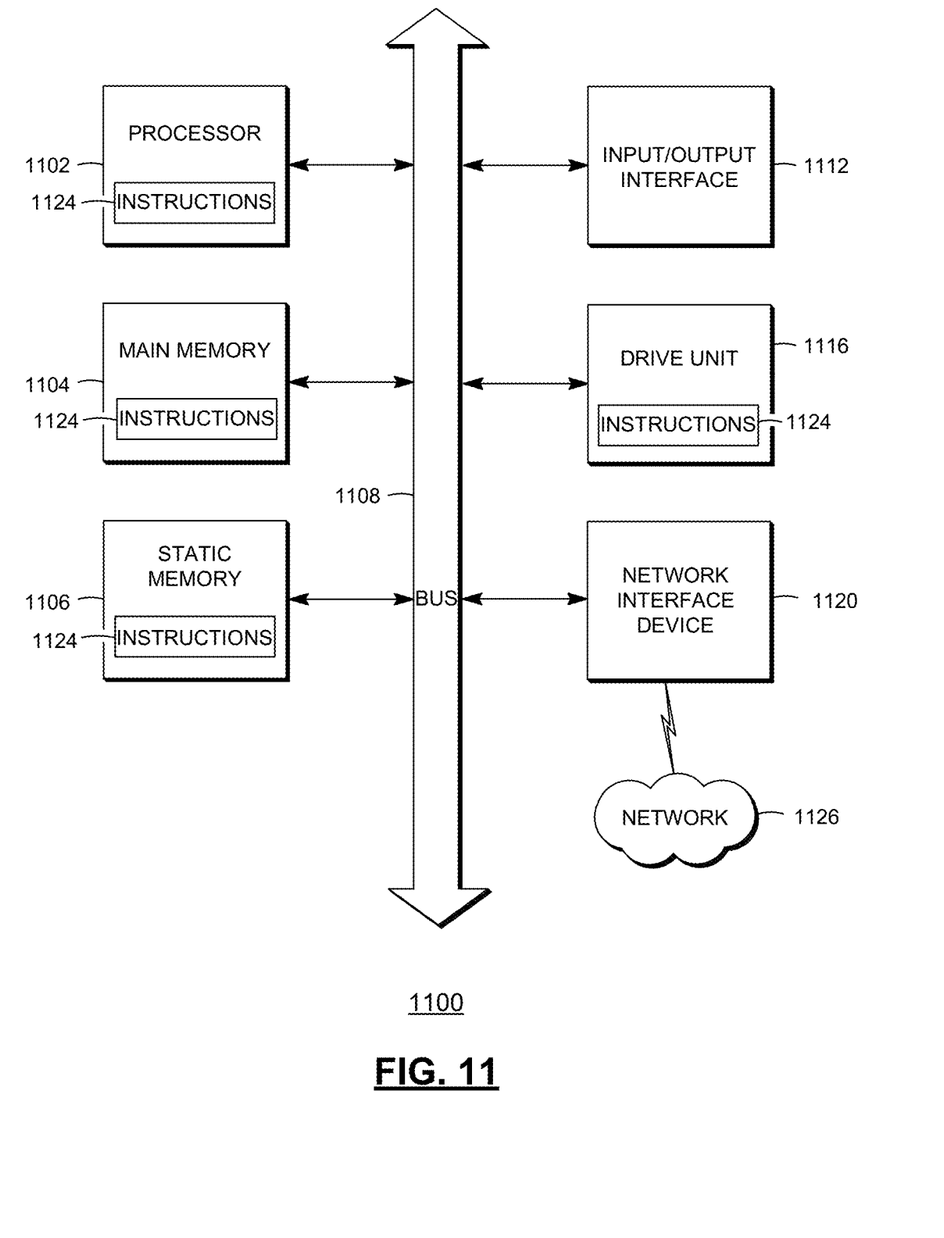
FIG. 11 is a block diagram illustrating an example computer system with which any of the clients or servers discussed herein may be implemented, in accordance with one aspect of the subject technology.

FIG. 11 is a block diagram illustrating an example computer system with which any of the clients or servers discussed herein may be implemented, in accordance with one aspect of the subject technology. In certain aspects, the computer system 1100 may be implemented using hardware or a combination of software and hardware, either in a dedicated server, or integrated into another entity, or distributed across multiple entities.

The example computer system 1100 includes a processor 1102, a main memory 1104, a static memory 1106, a disk drive unit 1116, and a network interface device 1120 which communicate with each other via a bus 1108. The computer system 1100 may further include an input/output interface 1112 that may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker).

Processor 1102 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 1124 embodying any one or more of the methodologies or functions described herein. The instructions 1124 may also reside, completely or at least partially, within the main memory 1104 and/or within the processor 1102 during execution thereof by the computer system 1100, with the main memory 1104 and the processor 1102 also constituting machine-readable media. The instructions 1124 may further be transmitted or received over a network 1126 via the network interface device 1120.

The machine-readable medium may be a single medium or multiple media (e.g., a centralized or distributed database, and/or associated caches and servers) that store the one or more sets of instructions. The machine-readable medium may include the drive unit 1116, the static memory 1106, the main memory 1104, the processor 1102, an external memory connected to the input/output interface 1112, or some other memory. The term "machine-readable medium" shall also be taken to include any non-transitory medium that is capable of storing, encoding or carrying a set of instructions for execution by the machine and that cause the machine to perform any one or more of the methodologies of the embodiments discussed herein. The term "machine-readable medium" shall accordingly be taken to include, but not be limited to, storage mediums such as solid-state memories, optical media, and magnetic media.

Systems, methods, and machine-readable media for providing notifications about users in a social network are thus provided. For example, a user of a social networking service may receive notifications when one or more contacts (e.g., other individuals or entities that the user knows or possibly does not know) add the user to a social circle. In another aspect, the user may also receive notifications when contacts that the user has added to a social circle also adds the user to a social circle (e.g., the contact in one of the user's social circles has added the user back). According to still another aspect, the user may receive a notification when contacts that the user has invited to join the social networking service join the social networking service.

The various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality.

Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" may be used herein to mean "serving as an example or illustration." Any aspect or design described herein as "exemplary" is not necessarily to be construed as preferred or advantageous over other aspects or designs.

Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method comprising:
    determining that a number of social graph events for a user have occurred on a social network, wherein each social graph event for the user is associated with an entity;
    calculating a score for each social graph event based on a profile for the user and a profile for the entity associated with the social graph event, wherein the score is based at least on a measure of closeness in relationship between the user and the entity and contacts that the user has in common with the entity, the measure of closeness determined from information associated with the profile for the user and the profile for the entity and accessed from a data repository;
    generating a notification for the user, wherein the notification comprises a plurality of information elements, wherein each information element is associated with one of the social graph events in the number of social graph events having the score that satisfies a threshold level, and wherein the plurality of information elements in the notification are prioritized based on the score for each of the social graph events;
    transmitting the notification for display in a prioritized area of a client device;
    generating a delayed notification for the user comprising information elements associated with the social graph events having the score that does not satisfy the threshold level; and
    transmitting the delayed notification for display in a separate area from the prioritized area of the client device.

2. The method of claim 1, wherein the determining of the number of social graph events for the user comprises determining that an entity has added the user to a social circle of the entity.

3. The method of claim 2, wherein the entity is in a social circle for the user.

4. The method of claim 1, further comprising transmitting the notification to the user.

5. The method of claim 4, further comprising delaying the transmitting of the notification to the user for a period of time based on the score for each of the social graph events.

6. The method of claim 1, wherein the profile for the user comprises background information for the user and contacts for the user.

7. The method of claim 6, wherein the calculating of the score for each social graph event based on the profile for the user and the profile for the entity associated with the social graph event is based on a number of contacts that the user has in common with the entity.

8. The method of claim 1, wherein the determining of the number of social graph events for the user comprises determining that an entity that the user has invited to join the social network has joined the social network.

9. A system comprising:
    one or more processors; and
    a non-transitory machine-readable medium comprising instructions stored therein, which when executed by the one or more processors, cause the one or more processors to perform operations comprising:
    determining that a number of events for a first user have occurred on a social network, wherein each event for the user is associated with a second user;
    calculating a score for each event based on a profile for the first user and a profile for the second user associated with the event, wherein the score is based at least on a measure of closeness in relationship between the first user and the second user and contacts that the first user has in common with the second user, the measure of closeness determined from information associated with the profile for the first user and the profile for the second user and accessed from a data repository;
    generating a notification for the first user, wherein the notification comprises a plurality of information elements, wherein each information element is associated with one of the events in the number of events having the score that satisfies a threshold level, and wherein the plurality of information elements in the notification are prioritized based on the score for each of the events;

transmitting the notification for display in a prioritized area of a client device;

generating a delayed notification for the first user comprising information elements associated with the social graph events having the score that does not satisfy the threshold level; and transmitting the delayed notification for display in a separate area from the prioritized area of the client device.

10. The system of claim 9, wherein the determining of the number of events for the first user comprises determining that the second user has added the first user to a social circle of the second user.

11. The system of claim 10, wherein the second user is in a social circle for the first user.

12. The system of claim 9, wherein the operations further comprise transmitting the notification to the first user.

13. The system of claim 12, wherein the operations further comprise delaying the transmitting of the notification to the first user for a period of time based on the score for each of the events.

14. The system of claim 9, wherein the determining of the number of events for the first user comprises determining that the second user that the first user has invited to join the social network has joined the social network.

15. The system of claim 9, wherein the calculating of the score for each event based on the profile for the first user and the profile for the second user associated with the event is based on a number of contacts that the first user has in common with the second user.

16. A non-transitory machine-readable medium comprising instructions stored therein, which when executed by a machine, cause the machine to perform operations comprising:

determining that a number of social graph events for a user have occurred on a social network, wherein each social graph event for the user is associated with an entity;

calculating a score for each social graph event based on information for the user and information for the entity associated with the social graph event, wherein the score is based at least on a measure of closeness in relationship between the user and the entity and contacts that the user has in common with the entity, the measure of closeness determined from information associated with the profile for the user and the profile for the entity and accessed from a data repository;

generating a notification for the user, wherein the notification comprises a plurality of information elements, wherein each information element is associated with one of the social graph events in the number of social graph events having the score that satisfies a threshold level, and wherein the plurality of information elements in the notification are prioritized based on the score for each of the social graph events;

transmitting the notification for display in a prioritized area of a client device;

generating a delayed notification for the user comprising information elements associated with the social graph events having the score that does not satisfy the threshold level, the generating delayed until at least two information elements are collected in the delayed notification; and transmitting the delayed notification for display in a separate area from the prioritized area of the client device.

17. The non-transitory machine-readable medium of claim 16, wherein the determining of the number of social graph events for the user comprises determining that an entity has added the user to a social circle of the entity.

18. The non-transitory machine-readable medium of claim 17, wherein the entity is in a social circle for the user.

19. The non-transitory machine-readable medium of claim 16, wherein the determining of the number of social graph events for the user comprises determining that an entity that the user has invited to join the social network has joined the social network.

20. The non-transitory machine-readable medium of claim 16, wherein the calculating of the score for each social graph event is based on a number of contacts that the user has in common with the entity.

* * * * *